US012717329B2

(12) United States Patent
Li et al.

(10) Patent No.: US 12,717,329 B2
(45) **Date of Patent: *Aug. 25, 2026**

(54) SYSTEMS AND METHODS FOR PATH PLANNING WITH LATENT STATE INFERENCE AND GRAPHICAL RELATIONSHIPS

(71) Applicants: Honda Motor Co., Ltd., Tokyo (JP); The Board of Trustees of the Leland Stanford Junior University, Stanford, CA (US)

(72) Inventors: Jiachen Li, Mountain View, CA (US); David F. Isele, Sunnyvale, CA (US); Kikuo Fujimura, Palo Alto, CA (US); Xiaobai Ma, Stanford, CA (US); Mykel J. Kochenderfer, Palo Alto, CA (US)

(73) Assignees: Honda Motor Co., Ltd., Tokyo (JP); The Board of Trustees of the Leland Stanford Junior University, Stanford, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 18/488,394

(22) Filed: Oct. 17, 2023

(65) Prior Publication Data

US 2024/0061435 A1 Feb. 22, 2024

Related U.S. Application Data

(63) Continuation of application No. 17/173,753, filed on Feb. 11, 2021, now Pat. No. 11,868,137.

(Continued)

(51) Int. Cl.

*G06N 3/08* (2023.01)
*B60W 40/04* (2006.01)

(Continued)

(52) U.S. Cl.

CPC .......... *G05D 1/0221* (2013.01); *B60W 40/04* (2013.01); *G05D 1/0219* (2013.01);

(Continued)

(58) Field of Classification Search

CPC .. G05D 1/0221; G05D 1/0219; G05D 1/0274; G05D 1/222; G05D 1/229;

(Continued)

(56) References Cited

U.S. PATENT DOCUMENTS

| | | | |
|---|---|---|---|
| 9,612,123 | B1 | 4/2017 | Levinson et al. |
| 10,671,076 | B1 | 6/2020 | Kobilarov et al. |

(Continued)

OTHER PUBLICATIONS

H. Bai, S. Cai, N. Ye, D. Hsu, and W. S. Lee, “Intentio •• aware online pomdp planning for autonomous driving in a crowd,” in IEEE International Conference on Robotics and Automation (ICRA), 2015, pp. 454-460.

(Continued)

*Primary Examiner* — Ashley L Redhead, Jr.

(74) *Attorney, Agent, or Firm* — Rankin, Hill & Clark LLP

(57) ABSTRACT

Systems and methods for path planning with latent state inference and spatial-temporal relationships are provided. A system includes an inference module, a policy module, a graphical representation module, and a planning module. The inference module receives sensor data associated with a plurality of agents. The inference module also maps the sensor data to a latent state distribution to identify latent states of the plurality of agents. The latent states identify agents of the plurality of agents as cooperative or aggressive. The policy module predicts future trajectories of the plurality of agents at a given time based on sensor data and the latent states of the plurality of agents. The graphical representation module generates a graphical representation based on the sensor data and a graphical representation neural (Continued)

network. The planning module generates a motion plan for the ego agent based on the predicted future trajectories and the graphical representation.

19 Claims, 7 Drawing Sheets

Related U.S. Application Data

(60) Provisional application No. 63/113,146, filed on Nov. 12, 2020.

(51) Int. Cl.
*G05D 1/00* (2006.01)
*G05D 1/222* (2024.01)
*G05D 1/229* (2024.01)
*G05D 1/24* (2024.01)

(52) U.S. Cl.
CPC .......... *G05D 1/0274* (2013.01); *G05D 1/222* (2024.01); *G05D 1/229* (2024.01); *G05D 1/24* (2024.01); *G06N 3/08* (2013.01); *B60W 2552/10* (2020.02); *B60W 2555/60* (2020.02)

(58) Field of Classification Search
CPC .... G05D 1/24; B60W 40/04; B60W 2552/10; B60W 2555/60; G06N 3/08; G06N 3/045; G06N 3/044; G06N 7/01; G06N 5/043; G06N 20/00; G06N 3/006; G08G 1/096791; G08G 1/096827; G08G 1/163; G01C 21/3407; G06Q 10/047; G06Q 50/40
See application file for complete search history.

(56) References Cited

U.S. PATENT DOCUMENTS

| | | | |
|---|---|---|---|
| 10,981,564 | B2 | 4/2021 | Herman et al. |
| 11,104,334 | B2 | 8/2021 | Yan et al. |
| 11,577,722 | B1 | 2/2023 | Packer et al. |
| 11,636,307 | B2 * | 4/2023 | Urtasun ............... G08G 1/0112 701/25 |
| 2018/0029612 | A1 * | 2/2018 | Tsuyunashi ........... B60W 40/04 |
| 2018/0194358 | A1 * | 7/2018 | Gaither ................. B60W 40/09 |
| 2019/0088135 | A1 | 3/2019 | Do et al. |
| 2019/0101919 | A1 | 4/2019 | Kobilarov et al. |
| 2019/0163182 | A1 | 5/2019 | Li et al. |
| 2019/0367025 | A1 | 12/2019 | Pathak et al. |
| 2019/0369637 | A1 | 12/2019 | Shalev-Shwartz et al. |
| 2019/0382007 | A1 * | 12/2019 | Casas ..................... G06V 20/58 |
| 2020/0031371 | A1 | 1/2020 | Soliman |
| 2020/0079385 | A1 | 3/2020 | Beaurepaire et al. |
| 2020/0079396 | A1 | 3/2020 | Beaurepaire et al. |
| 2020/0133308 | A1 | 4/2020 | Raichelgauz et al. |
| 2020/0137580 | A1 | 4/2020 | Yang et al. |
| 2020/0249674 | A1 | 8/2020 | Dally et al. |
| 2020/0293041 | A1 | 9/2020 | Palanisamy |
| 2020/0310423 | A1 * | 10/2020 | Cho ....................... G05D 1/021 |
| 2020/0324794 | A1 * | 10/2020 | Ma .................. B60W 60/00272 |
| 2020/0346643 | A1 | 11/2020 | Woon et al. |
| 2021/0001884 | A1 | 1/2021 | Alvarez et al. |
| 2021/0053561 | A1 | 2/2021 | Beller et al. |
| 2021/0129847 | A1 * | 5/2021 | Grubwinkler ...... G01C 21/3691 |
| 2021/0148727 | A1 * | 5/2021 | Narayanan .......... B60W 30/095 |
| 2021/0150899 | A1 | 5/2021 | Su et al. |
| 2021/0229656 | A1 | 7/2021 | Dax |
| 2021/0276595 | A1 | 9/2021 | Casas et al. |
| 2022/0343762 | A1 | 10/2022 | Alvarez et al. |
| 2023/0356753 | A1 * | 11/2023 | Liu ........................ G08G 1/167 |

OTHER PUBLICATIONS

P. W. Battaglia, J. B. Hamrick, V. Bapst, A. Sanchez•Gonzalez, V. Zambaldi, M. Malinowki, A. Tacchetti, D. Raposo, A. Santoro, R. Faulkner, et al., "Relational inductive biases, deep learning, and graph networks," arXiv preprint arXiv:1806.01261, 2018.

M. Bouton, A. Nakhaei, D. Isele, K. Fujimura, and M. J. Kochenderfer, "Reinforcement learning with iterative reasoning for merging in dense traffic," arXiv preprint arXiv:2005.11895, 2020.

J. Chen, B. Yuan, and M. Tomizuka, "Model-free deep reinforcement learning for urban autonomous driving, " in IEEE International Conference on Intelligent Transportation Systems (ITSC), 2019, pp. 2765-2771.

F. Codevilla, M. Miiller, A. López, V. Koltun, and A. Dosovitskiy, "End-to-end driving via conditional imitation learning," in IEEE International Conference on Robotics and Automation (ICRA), 2018, pp. 1-9.

C. Dong, J. M. Dolan, and B. Litkouhi, "Intention estimation for ramp merging control in autonomous driving," in IEEE Intelligent Vehicles Symposium (IV), IEEE, 2017, pp. 1584-1589.

J. Gao, C. Sun, H. Zhao, Y. Shen, D. Anguelov, C. Li, and C. Schmid, "Vectornet: Encoding hd maps and agent dynamics from vectorized representation," in Proceedings of the IEEE/CVF Conference on Computer Vision and Pattern Recognition, 2020, pp. 11525-11533.

S. Gu, E. Holly, T. Lillicrap, and S. Levine, "Deep reinforcement learning for robotic manipulation with aynchronous off-policy updates," in 2017 IEEE international conference on robotics and automation (ICRA), IEEE, 2017, pp. 3389-3396.

W. Hamilton, Z. Ying, and J. Leskovec, "Inductive representation learning on large graphs, " in Advances in neural information processing systems, 2017, pp. 1024-1034.

A. Hu, F. Cotter, N. Mohan, C. Gurau, and A. Kendall, "Probabilistic future prediction for video scene understanding," arXiv preprint arXiv:2003.06409, 2020.

Y. Huang, H. Bi, Z. Li, T. Mao, and Z. Wang, "Stgat: Modeling spatial-temporal interactions for human trajectory prediction," in Proceedings of the IEEE International Conference on Computer Vision, 2019, pp. 6272-6281.

D. Isele, R. Rahimi, A. Cosgun, K. Subramanian, and K. Fujimura, "Navigating occluded intersections with autonomous vehicles using deep reinforcement learning," in 2018 IEEE International Conference on Robotics and Automation (ICRA), IEEE, 2018, pp. 2034-2039.

M. Jaderberg, V. Mnih, W. M. Czarnecki, T. Schaul, J. Z. Leibo, D. Silver, and K. Kavukcuoglu, "Reinforcement learning with unsupervised auxiliary tasks," arXiv preprint arXiv: 1611.05397, 2016.

A. Kesting, M. Treiber, and D. Helbing, "Enhanced intelligent driver model to acces the impact of driving strategies on traffic capacity," Philosophical Transactions of the Royal Society of London A: Mathematical, Physical and Engineering Sciences, vol. 368, No. 1928, pp. 4585-4605, 2010.

Arne Kesting, Martin Treiber, and Dirk Helbing, "General lane-changing model mobil for car-following models," Transportation Research Record: Journal of the Transportation Research Board, No. 1999, pp. 86-94, 2007.

T. N. Kipf and M. Welling, "Semi-supervised classification with graph convolutional networks," arXiv preprint arXiv:1609.02907, 2016.

A. Kuefler, J. Morton, T. Wheeler, and M. Kochenderfer, "Imitating driver behavior with generative adverarial networks," in IEEE Intelligent Vehicles Symposium (IV), IEEE, 2017, pp. 204-211.

G. Lample and D. S. Chaplot, "Playing fps games with deep reinforcement learning," arXiv preprint arXiv:1609.05521, 2016.

J. Li, F. Yang, M. Tomizuka, and C. Choi, "Evolvegraph: Multi-agent trajectory prediction with dynamic relational reasoning," in 2020 Advances in Neural Information Processing Systems (NeurIPS), 2020.

M. Liang, B. Yang, Y. Chen, R. Hu, and R. Urtasun, "Multi•task multi-sensor fusion for 3d object detection," in IEEE Conference on Computer Vision and Pattern Recognition, 2019, pp. 7345-7353.

L. Liebel and M. Körner, "Auxiliary tasks in multi-task learning," arXiv preprint arXiv:1805.06334, 2018.

(56) References Cited

OTHER PUBLICATIONS

P. F. Lima, M. Trincavelli, J. Mårtenson, and B. Wahlberg, "Clothoid-based model predictive control for autonomous driving," in 2015 European Control Conference (ECC), IEEE, 2015, pp. 2983-2990.
Y. Lin, J. McPhee, and N. L. Azad, "Comparison of deep reinforcement learning and model predictive control for adaptive cruise control," IEEE Transactions on Intelligent Vehicles, 2020.
T. Matiisen, A. Labash, D. Majoral, J. Aru, and R. Vicente, "Do deep reinforcement learning agents model intentions?" arXiv preprint arXiv:1805.06020, 2018.
V. Mnih, K. Kavukcuoglu, D. Silver, A. Graves, I. Antonoglou, D. Wierstra, and M. Riedmiller, "Playing atari with deep reinforcement learning," arXiv preprint arXiv:J312.5602, 2013.
A. Mohamed, K. Qian, M. Elhoseiny, and C. Claudel, "Socia ••stgcnn: A social spatio-temporal graph convolutional neural network for human trajectory prediction," in Proceedings of the IEEE/CVF Conference on Computer Vision and Pattern. Recognition, 2020, p. 14424-14432.
A. Mohseni-Kabir, D. Isele, and K. Fujimura, "Interaction•aware multi-agent reinforcement learning for mobile agents with individual goals," in 2019 International Conference on Robotics and Automation (ICRA), IEEE, 2019, pp. 3370-3376.
J. Redmon, S. Divvala, R. Girshick, and A. Farhadi, "You only look once: Unified, real-time object detection," in IEEE Conference on Computer Vision and Pattern. Recognition, 2016, pp. 779-788.
D. Sadigh, S. Sastry, S. A. Sehia, and A. D. Dragan, "Planning for autonomous cars that leverage effects on human actions," in Robotics: Science and Systems, Ann Arbor, MI, USA, vol. 2, 2016.
A. E. Sallab, M. Abdou, E. Perot, and S. Yogamani, "Deep reinforcement learning framework for autonomous driving," Electronic Imaging, vol. 2017, No. 19, pp. 70-76, 2017.
D. M. Saxena, S. Bae, A. Nakhaei, K. Fujimura, and M. Likhachev, "Driving in dense traffic with model-free reinforcement learning," in 2020 IEEE International Conference on Robotics and Automation (ICRA), IEEE, 2020, pp. 5385-5392.
J. Schulman, S. Levine, p. Abbeel, M. Jordan, and p. Moritz, "Trust region policy optimization," in International conference on machine learning, 2015, pp. 1889-1897.
J. Schulman, F. Wolski, P. Dhariwal, A. Radford, and O. Klimov, "Proximal policy optimization algorithms," arXiv preprint arXiv:1707.06347, 2017.
S. Sharifzadeh, I. Chiotellis, R. Triebel, and D. Cremers, "Learning to drive using inverse reinforcement learning and deep q-networks," arXiv preprint arXiv: 1612.03653, 2016.
W. Song, G. Xiong, and H. Chen, "Intention-aware autonomous driving decision-making in an uncontrolled intersection," Mathematical Problems in Engineering, vol. 2016, 2016.
P. Veličković, G. Cucurull, A. Casanova, A. Romero, P. Lio, and Y. Bengio, "Graph attention networks," arXiv preprint arXiv:1710.10903, 2017.
T. Wang, R. Liao, J. Ba, and S. Fidler, "Nervenet: Learning structured policy with graph neural networks," in International Conference on Learning Representations, 2018.
R. J. Williams, "Simple statistical gradient-following algorithm for connectionist reinforcement learning," Machine learning, vol. 8, No. 3-4, pp. 229-256, 1992.
K. Xu, W. Hu, J. Leskovec, and S. Jegelka, "How powerful are graph neural networks?" arXiv preprint arXiv:1810.00826, 2018.
J. Yang, A. Nakhaei, D. Isele, K. Fujimura, and H. Zha, "Cm3: Cooperative multi-goal multi-stage multi-agent reinforcement learning," International Conference on Learning Representations, 2020.
M. Zhao, J. Zhang, C. Zhang, and W. Zhang, "Leveraging heterogeneous auxiliary tasks to assit crowd counting, " in IEEE Conference on Computer Vision and Pattern Recognition, 2019, pp. 12736-12745.
Simplilearn, "What is Graph Neural Network? | An Introduction to GNN and Its Applications", (2023) Online. Simplilearn. Web. https: //www.simplilearn.com/what-is-graph-neural-network-article#what_are_graph_neural_networks_gnn (Year: 2023).

* cited by examiner 200
202
204
206
208
210
212

SYSTEMS AND METHODS FOR PATH PLANNING WITH LATENT STATE INFERENCE AND GRAPHICAL RELATIONSHIPS

CROSS-REFERENCE TO RELATED APPLICATIONS

This application claims priority to U.S. patent application Ser. No. 17/173,753 filed on Feb. 11, 2021, which claims priority to U.S. Provisional Patent Application Ser. No. 63/113,146 filed on Nov. 12, 2020; the entirety of each of the above-noted applications is incorporated by reference herein.

BACKGROUND

Deep reinforcement learning (DRL) is used in various control and decision making tasks including robotics, games, and autonomous driving. Compared with traditional rule-based or optimization-based approaches to autonomous driving, DRL methods may have the potential for better scalability and generalization in complex driving scenarios that require observing subtle changes in behavior and executing complex interactions with other agents. DRL may be better suited to these problems due to the high representational capability of neural networks, better generalization to model mismatch, and the ability to efficiently model approximate solutions to intractable combinatoric relationships. However, DRL may require large amounts of data and is still prone to unexpected behavior on out-of-sample scenarios.

BRIEF DESCRIPTION

According to one embodiment, a system for path planning with latent state inference and spatial-temporal relationships is provided. The system includes an inference module, a policy module, a graphical representation module, and a planning module. The inference module receives sensor data associated with a plurality of agents. The plurality of agents includes an ego agent. The inference module also maps the sensor data to a latent state distribution to identify latent states of the plurality of agents. The latent states identify agents of the plurality of agents as cooperative or aggressive. The policy module predicts future trajectories of the plurality of agents at a given time based on sensor data and the latent states of the plurality of agents. The graphical representation module generates a graphical representation based on the sensor data and a graphical representation neural network. The planning module generates a motion plan for the ego agent based on the predicted future trajectories and the graphical representation.

According to another embodiment, a method for path planning with latent state inference and spatial-temporal relationships is provided. The method includes receiving sensor data associated with a plurality of agents. The plurality of agents includes an ego agent. The method also includes mapping the sensor data to a latent state distribution to identify latent states of the plurality of agents. The latent states identify agents of the plurality of agents as cooperative or aggressive. The method further includes predicting future trajectories of the plurality of agents based on sensor data and the latent states of the plurality of agents. The method yet further include generating a graphical representation based on the sensor data and a graphical representation neural network. The method includes generating a motion plan for the ego agent based on the predicted future trajectories and the graphical representation.

According to yet another embodiment, a non-transitory computer readable storage medium storing instructions that, when executed by a computer having a processor, cause the computer to perform a method for path planning with latent state inference and spatial-temporal relationships. The method includes receiving sensor data associated with a plurality of agents. The plurality of agents includes an ego agent. The method also includes mapping the sensor data to a latent state distribution to identify latent states of the plurality of agents. The latent states identify agents of the plurality of agents as cooperative or aggressive. The method further includes predicting future trajectories of the plurality of agents based on sensor data and the latent states of the plurality of agents. The method yet further include generating a graphical representation based on the sensor data and a graphical representation neural network. The method also includes generating a motion plan for the ego agent based on the predicted future trajectories and the graphical representation.

DETAILED DESCRIPTION

Figure 1:
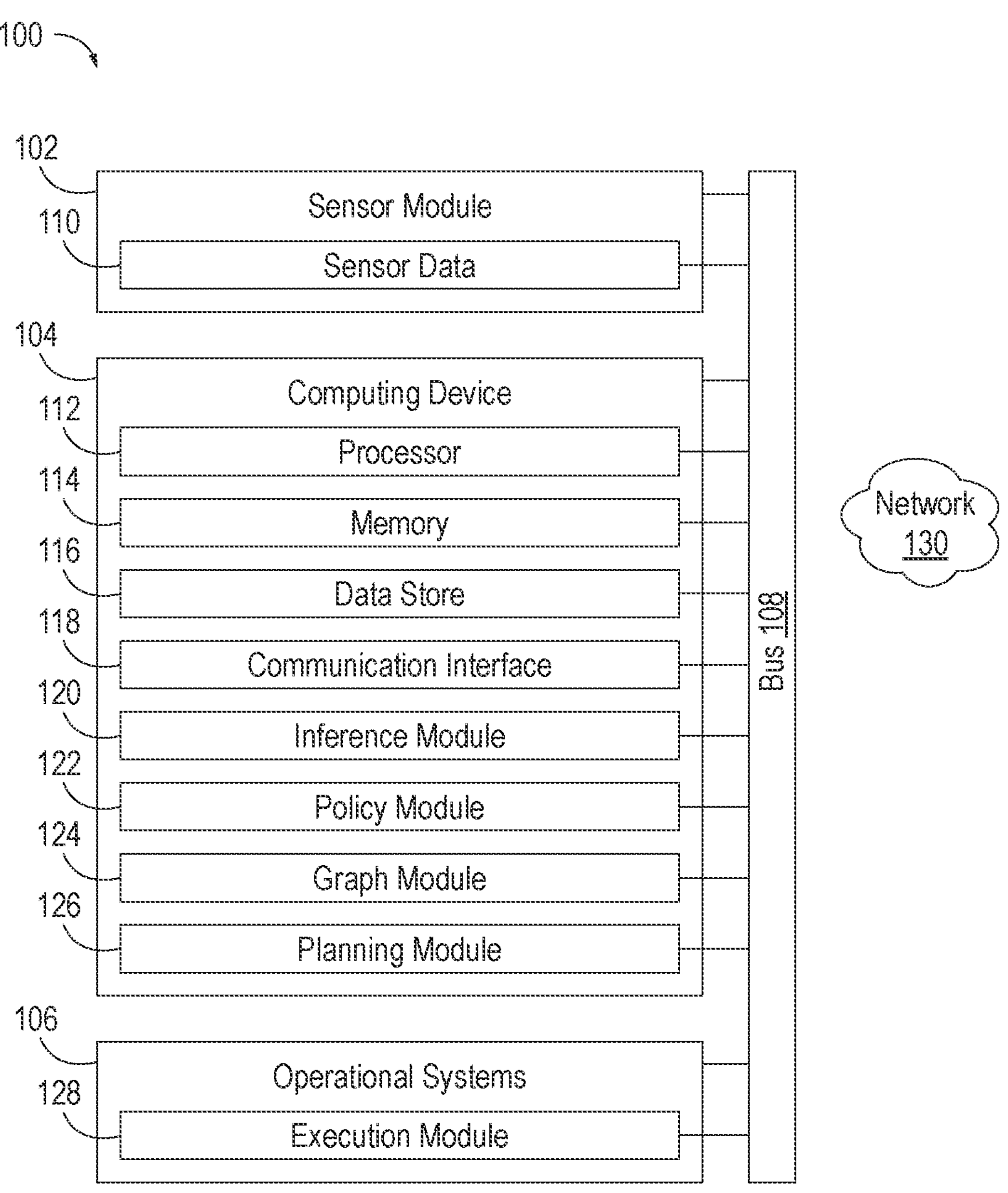
FIG. 1 is an exemplary operating environment of a system for path planning with latent state inference and graphical relationships, according to one aspect.

Generally described, the present disclosure relates to deep reinforcement learning (DRL) in complex path planning scenarios. Identifying the subtle cues that may indicate drastically different outcomes remains an open problem with designing autonomous systems that operate in human environments. The systems and methods described herein, explicitly infer the latent state and encoding relationships in a reinforcement learning framework to address this difficulty. In particular, the systems and methods described herein may encode prior knowledge on the latent states of other vehicles through a framework that combines the reinforcement learner with a supervised learner. Additionally, influence passing is modeled between different vehicles through graphical representation neural networks (GNNs). GNNs improve latent inference in the auxiliary task, while the latent inference improves the quality of the learned policy.

One approach to address anomalous behavior is to decompose the system into engineered sub-modules. Each submodule may be treated as a more controlled and more rigorously verified learning sub-problem existing as either stand-alone units or hybrid objectives. These sub components have behavior that is often easier to analyze, which greatly facilitates debugging complex systems. An auxiliary learning problem for inferring the latent state of traffic participants may be used to extract useful information that an unassisted learning system may otherwise miss.

As drivers are influenced by their surrounding vehicles, different traffic participants may directly or indirectly impact other drivers. For example, in highway driving, the host vehicle is more directly influenced by proximate vehicles closer to the host vehicle, while distant vehicles farther away from the host vehicle influence the host vehicle indirectly though chains of influence that propagate through the vehicles. Such influence-passing forms a graphical representation of a traffic scenario, where each node represents an agent of the plurality of agents and each edge represents a direct influence. These graphical representation are generated to represent these spheres of influence. By combining the latent inference with relational modelling, a reinforcement learning framework that explicitly learns to infer the latent states of surrounding drivers using graphical representation neural networks is provided. The reinforcement learning framework improves the performance of the path planning policy, while also providing labels of latent states and influence passing structure that help interpretability.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein may be a biological being or biological being propelled machine that moves through or manipulates an environment. Exemplary agents may include, but are not limited to, humans, vehicles driven by humans, or other machines operated, at least in part, by a human. Alternatively, the agent may be a self-propelled machine that moves through or manipulates the environment. Exemplary agents may include, but are not limited to, robots, vehicles, or other self-propelled machines, such as, an autonomous or semi-autonomous vehicle.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"Vehicle," as used herein, refers to any moving transport that is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. Further, the term "vehicle" may refer to an electric vehicle (EV) that is capable of carrying one or more users and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. Further, the term "vehicle" may include vehicles that are automated or non-automated with predetermined paths or free-moving vehicles.

"Vehicle system," as used herein may include, but is not limited to, any automatic or manual systems that may be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, a monitoring system, a passenger detection system, a vehicle suspension system, a vehicle seat configuration system, a vehicle cabin lighting system, an audio system, a sensory system, an interior or exterior camera system among others.

System Overview

Referring now to the drawings, the drawings are for purposes of illustrating one or more exemplary embodiments and not for purposes of limiting the same. FIG. 1 is an exemplary component diagram of an operating environment 100 for path planning with latent state inference and spatial-temporal relationships, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

Figure 2:
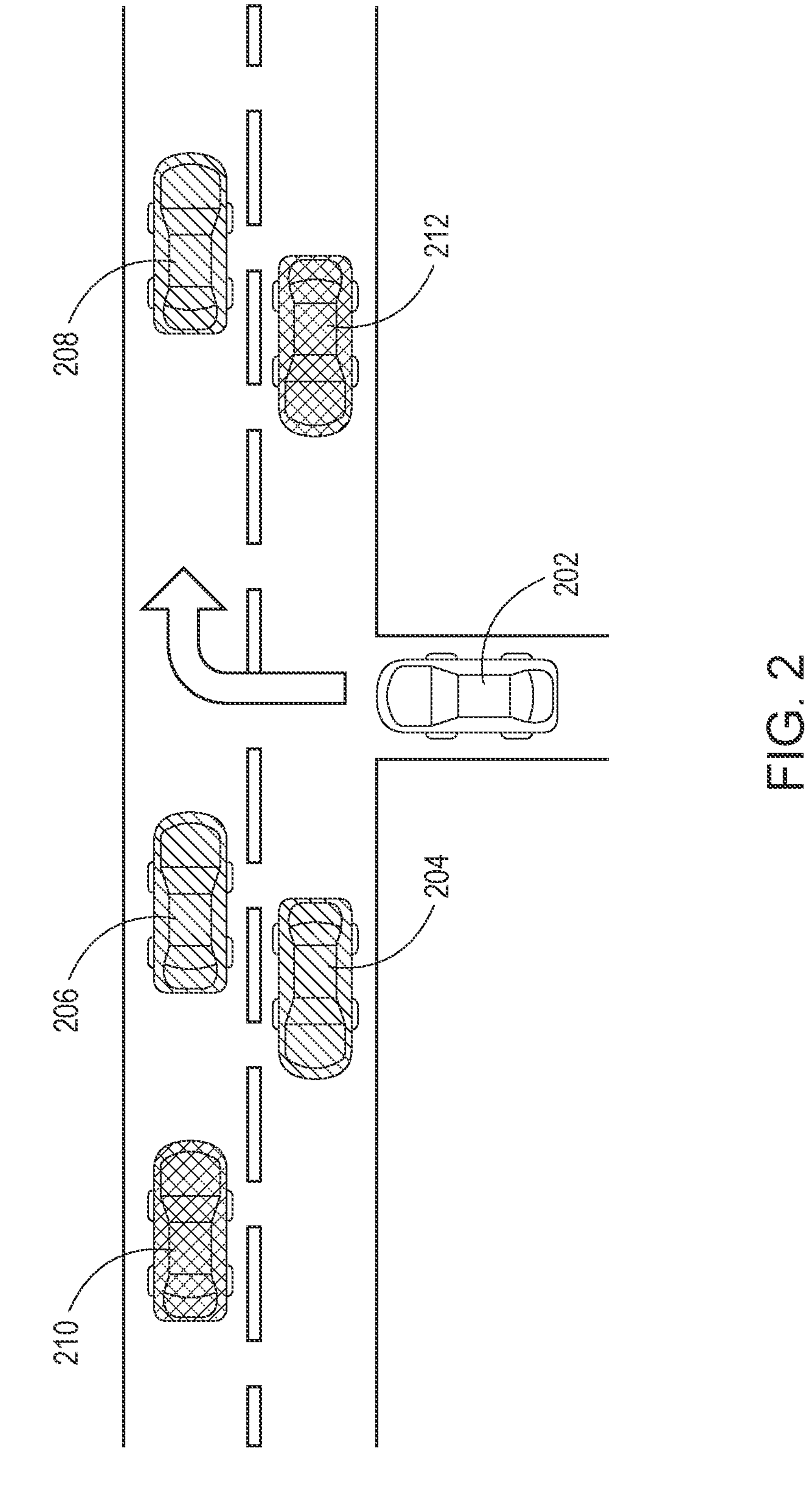
FIG. 2 is an exemplary vehicular embodiment for a system for path planning with latent state inference and graphical relationships, according to one aspect.

The computing device may be implemented as a part of an ego agent, such as the ego agent 202 of the roadway 200, shown in FIG. 2. For example, the ego agent 202 may be a bipedal, two-wheeled, four-wheeled robot, a vehicle, or a self-propelled machine. The ego agent 202 may be configured as a humanoid robot. The ego agent 202 may take the form of all or a portion of a robot. The computing device 104 may be implemented as part of a telematics unit, a head unit, a navigation unit, an infotainment unit, an electronic control unit, among others of the ego agent 202. In other embodiments, the components and functions of the computing device 104 can be implemented with other devices (e.g., a portable device) or another device connected via a network (e.g., a network 130).

The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

The agents of the plurality of agents may include sensors for sensing objects and the environment. For example, the ego agent 202 of the plurality of agents may include a light sensor (not shown) to capture light data from around the ego agent 202. For example, a light sensor may rotate 360 degrees around ego agent 202 and collect the sensor data 110 in sweeps. Conversely, a light sensor may be omnidirectional and collect sensor data 110 from all directions simultaneously. A sensor of an agent may emit one or more laser beams of ultraviolet, visible, or near infrared light toward the surrounding environment of the ego agent 202.

Sensors of the agents of the plurality of agents may be positioned at any location on an agent of the plurality of agents. For example, suppose that the agent is a vehicle, one more sensors may be positioned at external front and/or side portions of an agent of the plurality of agents, including, but not limited to different portions of the vehicle bumper, vehicle front lighting units, vehicle fenders, and the windshield. Additionally, the sensors may be disposed at internal portions of the ego agent 202 including the vehicle dashboard (e.g., dash mounted camera), rear side of a vehicle rear view mirror, etc. Sensors may be positioned on a planar sweep pedestal (not shown) that allows the one or more image sensors to be oscillated to capture images of the environment at various angles.

Accordingly, the sensors and/or the sensor module 102 are operable to sense a measurement of data associated with the agent of the plurality of agents, the operating environment 100, the roadway 200, and/or the operational systems 106 and generate a data signal indicating said measurement of data. These data signals can be converted into other data formats (e.g., numerical) and/or used by the sensor module 102, the computing device 104, and/or the operational systems 106 to generate sensor data 110 including data metrics and parameters. The sensors can be any type of sensor, for example, acoustic, electric, environmental, optical, imaging, light, pressure, force, thermal, temperature, proximity, gyroscope, and accelerometers, among others. Furthermore, a single sensor may be described that includes multiple sensors and/or sensing components.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources, which will be described herein. Additionally, the computing device 104 also includes an inference module 120, a policy module 122, a graph module 124, and a planning module 126 for path planning with latent state inference and spatial-temporal relationships facilitated by the components of the operating environment 100.

The inference module 120, the policy module 122, the graph module 124 and/or the planning module 126, may be artificial neural networks that act as a framework for machine learning, including deep reinforcement learning. For example, the inference module 120, the policy module 122, the graph module 124 and/or the planning module 126 may be a convolution neural network (CNN). In one embodiment, inference module 120, the policy module 122, the graph module 124 and/or the planning module 126 may include a conditional generative adversarial network (cGAN). One or more of the inference module 120, the policy module 122, the graph module 124 and/or the planning module 126 may be a graphical representation neural network that is applied to graphical representation structures. In another embodiment, the inference module 120, the policy module 122, the graph module 124 and/or the planning module 126 may include an input layer, an output layer, and one or more hidden layers, which may be convolutional filters. In some embodiments, one or more of the modules may include Long Short Term Memory (LSTM) networks and LSTM variants (e.g., E-LSTM, G-LSTM, etc.).

The computing device 104 is also operably connected for computer communication (e.g., via the bus 108 and/or the communication interface 118) to one or more operational systems 106. The operational systems 106 can include, but are not limited to, any automatic or manual systems that can be used to enhance the ego agent 202, operation, and/or safety. The operational systems 106 include an execution module 128. The execution module 128 monitors, analyses, and/or operates the agent, to some degree. For example, the execution module 128 may store, calculate, and provide directional information and facilitates features like vectoring and obstacle avoidance among others. In a vehicular embodiment, the execution module 128 may provide operational data to vehicle systems, such as the steering system, that cause the ego agent 202 to operate autonomously. In some embodiments, the execution module 128 may be a Proportional, Integral, Derivative (PID) controller. Continuing the vehicular embodiment described above, the execution module 128 may be a longitudinal PD controller. The operational systems 106 may dependent on the implementation.

The operational systems 106 also include and/or are operably connected for computer communication to the sensor module 102. For example, one or more sensors of the sensor module 102 may be incorporated with execution module 128 to monitor characteristics of the roadway 200 or the ego agent 202. Suppose that the execution module 128 is facilitating execution of a right turn onto a street. The execution module 128 may receive sensor data 110 from the sensor module 102 to confirm that vehicles present on the street are yielding as expected.

The sensor module 102, the computing device 104, and/or the operational systems 106 are also operatively connected for computer communication to the network 130. The network 130 is, for example, a data network, the Internet, a wide area network (WAN) or a local area (LAN) network. The network 130 serves as a communication medium to various remote devices (e.g., databases, web servers, remote servers, application servers, intermediary servers, client machines, other portable devices). The operating environment 100 facilitates the ego agent 202 path planning with latent state inference and spatial-temporal relationship. Detailed embodiments describing exemplary methods using the system and network configuration discussed above will now be discussed in detail.

Methods for Curious Agents in Uncertain Environments

Figure 3:
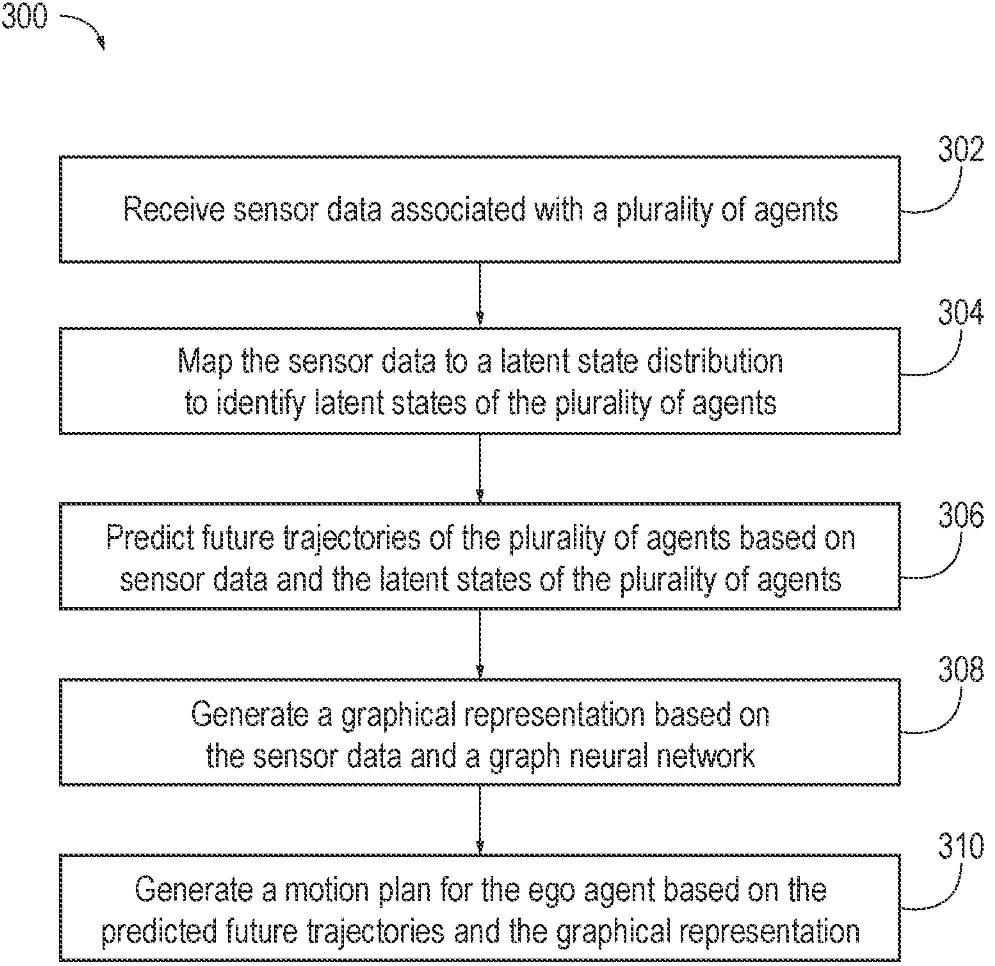
FIG. 3 is an exemplary process flow of a method for path planning with latent state inference and graphical relationships, according to one aspect.

Referring now to FIG. 3, a method 300 for ego agent 202 path planning with latent state inference and spatial-temporal relationships will now be described according to an exemplary embodiment. FIG. 3 will also be described with reference to FIGS. 1 and 2. For simplicity, the method 300 will be described as a sequence of blocks, but it is understood that the elements of the method 300 can be organized into different architectures, elements, stages, and/or processes.

At block 302, the method 300 includes the inference module 120 receiving sensor data 110 receiving sensor data associated with a plurality of agents. The sensor data 110 describes the kinematics (e.g., position, velocity, acceleration, trajectory, etc.) among each of the agent of the plurality of agents. For example, suppose that the ego agent 202 is a host vehicle on a roadway 200. The roadway 200 can be any type of road, highway, freeway, or travel route. In FIG. 2, the roadway 200 includes a T-intersection with two lanes having vehicles traveling in opposing longitudinal directions, namely, a lane $j_1$ and a lane $j_2$, that are intersected by a lane, namely $j_3$, with a the ego agent 202 positioned to cross the lane $j_1$ and/or the lane $j_2$. However, it is understood that the roadway 200 can have various configurations not shown in FIG. 2 and can have any number of lanes.

The ego agent 202 shares the roadway with a plurality of agents such as the agent 204, agent 206, agent 208, agent 210, and agent 212 of the plurality of agents, including agents 202-212, traveling in the lane $j_1$ and the lane $j_2$. Consider an embodiment in which the ego agent 202 is attempting to merge from the lane $j_3$ to the lane $j_1$. The behavior of the agents 204-212 are based their latent characteristics, which may not be directly observable. For example, when turning at a free T-intersection the ego agent 202 determines whether the on-coming agents are willing to yield to the ego agent 202. Successfully inferring the latent states of the agents 204-212 can help the ego agent 202 path plan.

At block 304, the method 300 includes the inference module 120 mapping the sensor data 110 to a latent state distribution to identify latent states of the plurality of agents. The latent states describe behavior characteristics exhibited by the agents. For example, consider the driving scenario containing the ego agent and n, here the agents 204-212. The ego agent 202 may be at least partially controlled based on the planning module 126. The agents 204-212 may be partially controlled by humans. For example, the agent 204-212 may be human controlled or at least partially autonomously operated.

An autonomous vehicle may be driven in different modes, for example, a cautious mode, cooperative mode, aggressive mode, and power mode, among others. Each of the modes may be associated with behavior parameters that define a behavior of the agent. Accordingly, an agent of the plurality of agents may be operated in a mode having behavior models that describe a preferred style of driving as it pertains to the kinematic operation of agent. For example, the kinematic parameters may include a destination, preferred travel route, acceptance of routes with toll roads, desired average travel speed, maximum travel speed, minimum travel speed, preferred lane, amongst others.

The behavior parameters may also include parameters for specific maneuvers. For example, a lane change maneuver may have specific kinematic parameters that describe the instances when the agent should be slowed to create a gap for another agent. The behavior parameters may also indicate the manner of a lane change maneuver, such as the physical boundaries of the lane change, including the desired gap length between a preceding vehicle and a following vehicle or the number of lanes that can be laterally traversed in a lane change maneuver. Therefore, agents of the plurality of agents may be autonomously operated but exhibit latent states associated with a mode.

By way of example, suppose that the goal of the ego agent 202 is to laterally traverse the lane $j_2$ from the lane $j_3$ to merge into the lane $j_1$. The sensor data 110 associated with the agents 204-212 is mapped to a latent state distribution to identify latent states of the plurality of agents. For example, let $$x_t^i$$

denote the physical state of an agent i of the plurality of agents at a time step t. The action distribution of the $i^{th}$ agent as $$P(a_t^i \mid x_t^i, h_t^i) \text{ where } h_t^i$$

represents the latent state of the agent. The goal of the inference module 120 is to learn $$P(h_t^i \mid o_{1:t}),$$

where $o_{1:t}$ is the historical observation of the sensor data 110 of the ego agent 202 up to time t. The sensor data 110 includes historical observations of the ego agent may include kinematics (e.g., position, velocity, acceleration, trajectory, etc.) of one or more of the plurality of agents. The latent inference network learns the mapping from the historical observations to the latent distribution, $$P_\phi(h_t^i \mid o_{1:t}),$$

where ø contains the parameters of the inference module 120.

In one embodiment, inference module 120 may use a Markov decision process (MDP) defined by the tuple (S, A, T, R, γ, $\rho_0$) to describe the sequential decision making process of the ego agent 202 interacting with the roadway 200. S is a finite state space, A is a finite action space, and $T:S\times A\times S\rightarrow\mathbb{R}$ is a state transition probability function. $R:S\times A\rightarrow\mathbb{R}$ is the reward model. $\gamma\in[0,1]$ is a discount factor and $\rho_0:S\rightarrow\mathbb{R}$ is the initial state distribution. However, because the states may not be readily observable, a partially observable Markov decision process (POMDP) may be used when the state is not directly observable. The POMDP may be given by (S, A, T, R, $\gamma$, $s_0$, $\Omega$, O). Furthermore, the observation function $\Omega:S\rightarrow O$ that maps the state $s\in\mathcal{S}$ to an observation $o\in O$ where O is the observation space.

Given the embodiment described above, the goal is to maintain smoothness of the traffic while making a turn into the lane $j_1$. The physical state of the scenario is defined as:

$$x=[x^0,x^1,x^2 \ldots x^n]$$

where $x^0\in\mathbb{R}^4$ is the state of the ego agent 202 containing its position and velocity, $x^1\in\mathbb{R}^4$ is the state of the ith agent, and n is the total number of agents in the plurality of agents. The number of agents in the plurality of agents is not constant because agents may enter into or exit from the roadway 200.

The latent state of the agents in the plurality of agents is defined by:

$$h=[h^1,h^2 \ldots h^n]$$

where $h^1\in$ {COOPERATIVE, AGGRESSIVE} indicates the driving style of the ith agent. Accordingly, the latent states may identify agents of the plurality of agents as cooperative or aggressive. In this manner, the agents 204-212 may be labeled as "cooperative" or "aggressive." The joint state is then represented by:

$$s=[x^0,(x^1,h^1),+(x^2,h^2) \ldots (x^n,h^n),]$$

The physical states of the agents of the plurality of agents are observable to the ego agent 202 but the latent state are not so the observation may be given by:

$$o=[x^0+\epsilon^0,x^1+\epsilon^1,x^2+\epsilon^2 \ldots x^n+\epsilon^n]$$

where $\epsilon^i$ is a small observation noise added to the observation on the physical state of the ith agent sampled from a zero-mean Gaussian. In a training scenario, a simulation proceeds with an interval of 0.1 seconds between consecutive time steps. The agents 204-212 of the plurality of agents may be modeled with a desired speed of 3 meters per second. The actual acceleration of the agents 204-212 are also influenced by a Gaussian noise with a standard deviation of 0.1. Upon noticing the ego agent 202, suppose that the agent 212 shrinks the gap with its leading vehicle, agent 204 to prevent the ego agent 202 merging into the lane $j_2$. The agents may exhibit a broad variety of subtle cues indicating their future behavior, and modeling that behavior accurately in simulation in an open problem. To ensure these subtle differences exist, the differences in behavior may be modeled with overlapping distributions of gap size. Cooperative agents, such as agents 204, 206, and 208 vary their desired front gap between 0.5 to 0.8 uniformly of the original gap, and the aggressive agents, such as agents 210 and 212, varies its desired gap between 0.4 to 0.7 uniformly of the original gap. The cooperative agents 204, 206, and 208 would yield to the ego agent 202 if they intercept laterally or the ego agent 202 is approaching the intersection center with a speed larger than 0.5 meter, while the aggressive agents 210 and 212 would ignore the ego agent. Accordingly, the actions of agents of the plurality of agents are modeled by mapping the sensor data 110 to the latent state distribution.

At block 306, the method 300 includes the policy module 122 predicting future trajectories of the plurality of agents at a given time based on sensor data 110 and the latent states of the plurality of agents. The policy module 122 takes input of both the sensor data 110 and the latent states $$\pi_\theta(a \mid o_{1:t}, h_t^{1:n})$$

where $\theta$ includes network policy parameters.

As one example the objective of a POMDP may be to identify a policy $\pi:O\rightarrow A$ that maximizes expected return:

$$\pi^* = \operatorname{argmax}\mathbb{E}_{s_0 a_0 o_0} \cdots \sum_{t=0}^{\infty}\gamma^t R(s_t, a_t)$$

where $s_0\sim\rho_0(s_0)$, $a_t\sim\pi(a_t|o_t)$, $o_t\sim\Omega(o_t|s_t)$, and $s_{t+1}\sim T(s_{t+1}|s_t, a_t)$.

The inference module 120 may be trained through supervised learning loss as will be described with respect to FIGS. 4A-4C. By using the information provided by the latent state labels, the inference module 120 provides additional learning signals than a traditional reinforcement learner. The inference module 120 performs as a distinct module that is separate from the policy module 122. In this manner, the inference module 120 acts as a sub-module. As a submodule, the inference module 120 may have behavior that is easier to analyze, when separate from the policy module 122.

Figure 4A:
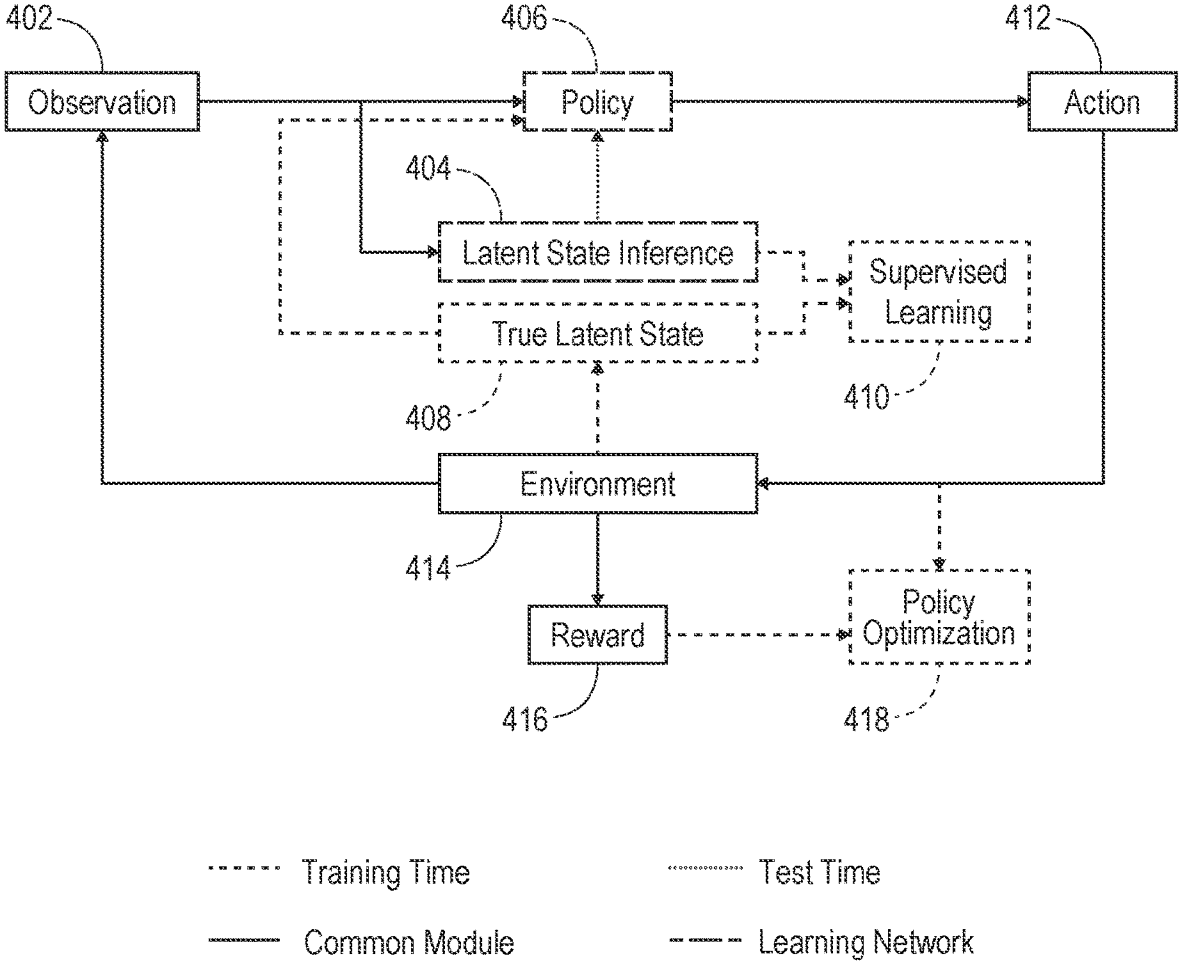
FIG. 4A is an exemplary framework for path planning with latent state inference and graphical relationships, according to one aspect.
Figure 4B:
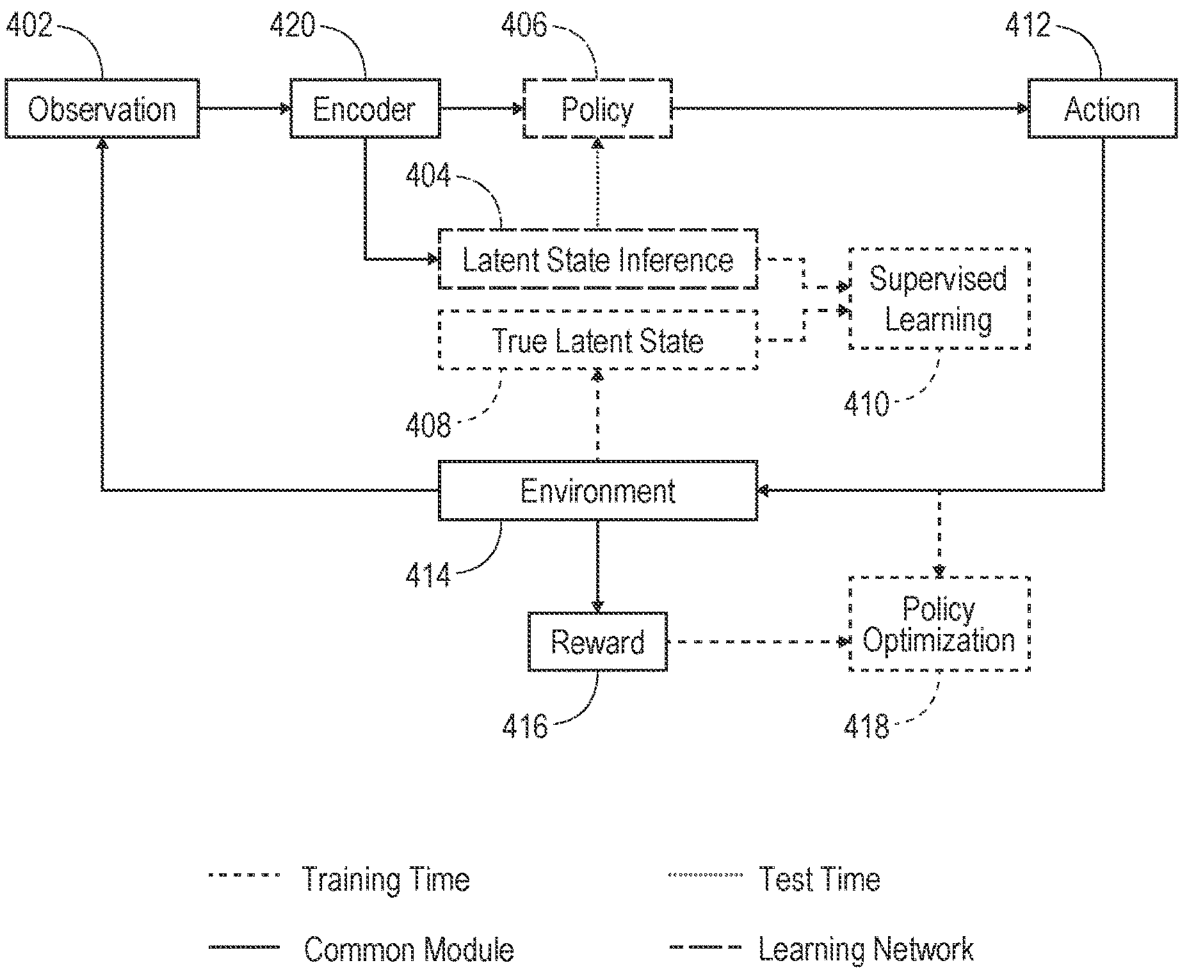
FIG. 4B is another exemplary framework for path planning with latent state inference and graphical relationships, according to one aspect.
Figure 4C:
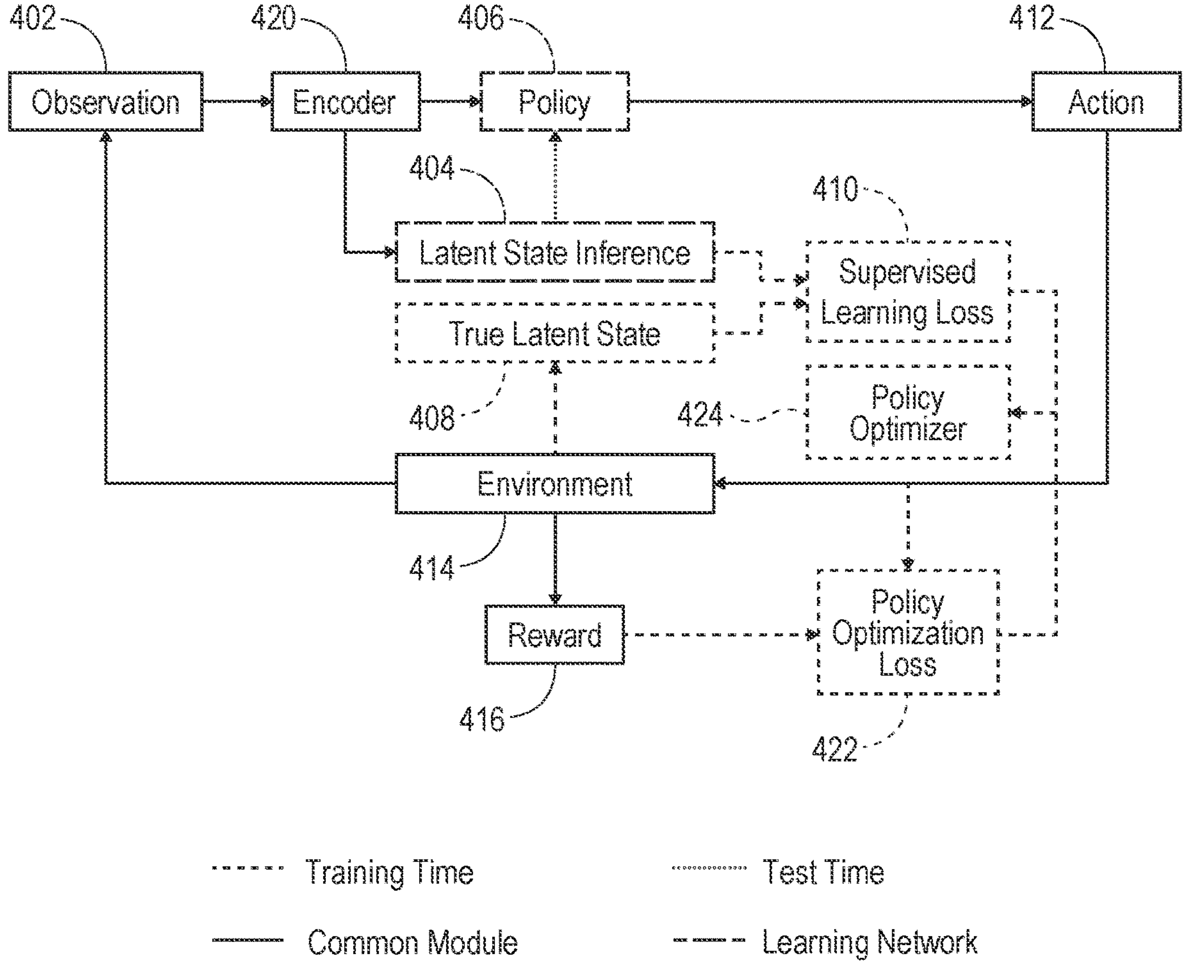
FIG. 4C is yet another exemplary framework for path planning with latent state inference and graphical relationships, according to one aspect.

Turning to FIGS. 4A, 4B, and 4C, example system architecture for intention inference and policy optimization with the separate modules, the inference module 120 and the policy module 122 are shown. Turning to FIG. 4A, suppose that the sensor data 110 includes spatio-temporal observations 402 about the environment 414. The inference module 120 makes a latent state inference 404 based on the spatio-temporal observations 402. A policy 406 takes the spatio-temporal observations 402 and the latent state inference 404 as input. The latent state inference 404 uses a network in accordance with the inference module 120 and the policy 406 uses a network in accordance with the policy module 122.

During training, the true latent states 408 of the agents of the plurality of agents are known for supervised learning 410. Accordingly, when an action 412, such as the target action of the ego agent 202, described above as a target speed, is executed, more information about the environment 414 can be gathered. In particular, the sensor data 110 about the environment 414 may indicate how the agents of the plurality of agents actually behaved, thereby demonstrating the true latent states 408.

Furthermore, a reward 416 uses a reward function to encourage the ego agent 202 to achieve a goal while operating safely. Returning to the vehicular embodiment, the reward 416 may incentivize the ego agent 202 to pass through the intersection as quickly as possible while avoiding collisions. A corresponding reward function of the reward 416 may be given by:

$$R(s,a)=r_{goal}1(s\in S_{goal})+r_{fail}1(s\in S_{fail})+r_{speed}(s)$$

In the vehicle embodiment described with respect to FIG. 2, the $r_{goal}=2$ and $S_{goal}$ is the set of goal states where the ego agent 202 successfully makes a full right-turn. $r_{fail}=-2$ and $S_{fail}$ is the set of failure states where there is a collision.

$$r_{speed}(s) = 0.01\frac{v_{ego\,agent}}{3\ m/s}$$

is a small reward based on the speed of the ego agent. The reward 416 may be applied via the Markov decision process (MOP) or the partially observable Markov decision process (POMDP) described above.

Using the reward 416, policy optimization 418 can be applied during training. Policy optimization 418 my directly optimizing the policy parameters through policy gradients. For example, in terms of the MOP setting, the policy optimization 418 may utilize an unbiased gradient estimator with the objective:

$$L^{PG}(\theta)=\hat{\mathbb{E}}[\log \pi_\theta(a,s)\hat{A}]$$

where $\hat{\mathbb{E}}$ is the empirical average over the experiences collected using the current policy parameters θ, and Â is the estimated advantage. For a POMDP, the state may be replaced by the observation and the hidden state of the policy. Accordingly, the policy can be updated according to:

$$\text{maximise}_\theta \hat{\mathbb{E}}\left[\frac{\pi_\theta(a \mid s)}{\pi_{\theta,old}(a \mid s)}\hat{A}\right]$$

$$\text{subject to } \hat{\mathbb{E}}[D_{KL}(\pi_{\theta,old}(\cdot \mid s), \pi_\theta(\cdot \mid s))] \leq \delta$$

where $D_{KL}$ is the Kullback-Leibler divergence and δ policy optimization 418 is a step size. The policy optimization 418 may be simplified as:

$$L^{PPO}(\theta)=\hat{\mathbb{E}}[\min(r(\theta)\hat{A}, \text{clip}(r(\theta),1-\epsilon,1+\epsilon)\hat{A})]$$

where $r(\theta)=\pi_\theta(a|s)/\pi_{\theta,old}(a|s)$ is the probability ratio and ∈ is the clipping range. Such constraints on the update step size provides stable performance.

FIG. 4B operates in a similar manner as described above, however in FIG. 4B, an encoder 420 is shared between the latent state inference 404 and the policy 406. However, in FIG. 4B the latent state inference 404 and the policy 406 are trained with separate losses and optimizers. In FIG. 4C, besides the shared encoder 420, the losses from two tasks are also coupled by a weighted sum and the entire framework shown in FIG. 4C is trained with the policy optimization optimizer 422 and the policy optimizer 424.

Returning to FIG. 3, at block 308, the method 300 includes the graph module 124 generating a graphical representation based on the sensor data and a graphical representation neural network. An agent's actions are influenced by their relations to other agents. The shared dependence of different agents can be formalized as a graphical representation with each agent represented as a node. Thus, the graphical representation describes shared dependence of the agents of the plurality of agents.

Typically an agent may only consider the closest agents. Returning to the vehicular embodiment, shown in FIG. 2 operating a lane $j_1$ and a lane $j_2$ of the roadway 200, here the ego agent 202 is able to take into consideration all agents of the plurality of agents to make a long-term plan based on the generated a graphical representation. For example, the T-intersection scenario at time t may be given by graphical representation $\mathcal{G}_t=(\mathcal{V}_t, \varepsilon_t)$ where the node set $\mathcal{V}_t$ contains the nodes for all the agents in the roadway 200. A distinct LSTM may be used to obtain the node embedding for the ego agent 202 and a shared LSTM for the other agents 204-212 of the plurality of agents. The input of LSTMs is the physical state of a corresponding agent. For the separated structure, the embedding also contains the latent state of the ego agent 202. The edge set $\varepsilon_t$ contains undirected edges between the ego agent 202 and the other agents 204-212, as well as between each agent and its closest neighbors, for example, in the same lane.

In some embodiments, temporal information is included with the sensor data 110. For example, a graph module 124 may act to facilitate message passing for a model. The graph module 124 may receive temporal information, for example, from agents of the plurality of agents via message passing, operational systems 106, etc. The graph module 124 may include a message passing module and LSTM networks to incorporate the temporal information. The graph module 124 applies the temporal information to include spatial-temporal relationships in the graphical representation. The agents 204-212 of the plurality of agents may share a network, such as the same LSTM, to encode state embedding, while the ego agent 202 uses a distinct one. The intention inference network uses the LSTM output of the agents 204-212 of the plurality of agents at the current time step t to predict the corresponding intentions of the agents 204-212 of the plurality of agents. In this manner, the graphical representation includes spatial-temporal relationships.

At block 310, the method 300 includes the planning module 126 generating a motion plan for the ego agent based on the predicted future trajectories and the graphical representation. The ego agent 202 may update a motion plan that defines the manner in which the ego agent 202 interacts agents of the plurality of agents on the roadway 200. For example, the motion plan may be updated to cause execution module 128 to cause the ego agent 202 to execute a turn maneuver from the lane $j_3$ to the lane $j_1$ based on the latent states of the agents of the plurality of agents.

The systems and methods described herein separates the inference module 120 that defines latent states and the policy module 122. By treating the latent state as an auxiliary learning problem for inferring the latent state of agent, the inference module 120 is able to extract useful information that an unassisted learning system may otherwise miss. Additionally, the graphical representation generated by the graph module 124 allows the systems and methods to model the shared dependence of agents of the plurality of agents. For example, such influence-passing forms a graphical representation of a traffic scenario, where each node represents an agent of the plurality of agents and each edge represents a direct influence. By combining the latent inference with relational modelling, a reinforcement learning framework that explicitly learns to infer the latent states of surrounding drivers using graphical representation neural networks is provided. The reinforcement learning framework improves the performance of the path planning policy, while also providing labels of latent states and influence passing structure that help interpretability.

Figure 5:
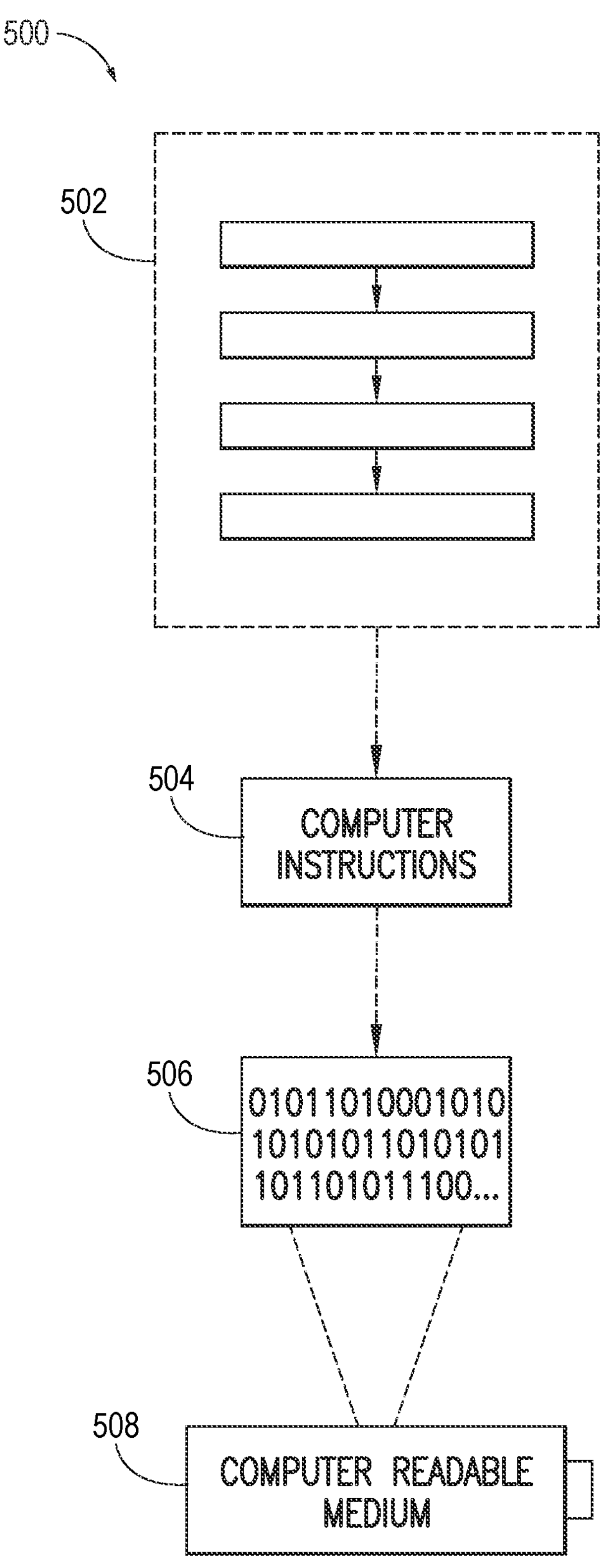
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 300 of FIG. 3. In another aspect, the processor-executable computer instructions 504 may be configured to implement a system, such as the operating environment 100 of FIG. 1 and/or the framework shown in the graphical representation of FIG. 4A, FIG. 4B, and/or FIG. 4C. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

The term "computer readable media" as used herein includes computer storage media. Computer storage media includes volatile and nonvolatile, removable and non-removable media implemented in any method or technology for storage of information such as computer readable instructions or other data. The memory 114 and the data store 116 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the sensor module 102, the computing device 104, and/or the operational systems.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for path planning with latent state inference and graphical relationships, the system comprising:

an inference module configured to:

receive sensor data associated with a plurality of agents, wherein the plurality of agents includes an ego agent; and map the sensor data to a latent state distribution to identify latent states of the plurality of agents;

a policy module configured to predict future trajectories of the plurality of agents at a given time based on the sensor data and the latent states of the plurality of agents;

a graphical representation module configured generate a graphical representation based on the sensor data and a graphical representation neural network, wherein temporal information is applied to the sensor data so the graphical representation includes spatial-temporal relationships between the ego agent and the agents of the plurality of agents;

a planning module configured to generate a motion plan for the ego agent based on the predicted future trajectories and the graphical representation; and an execution module configured to cause the ego agent to execute the motion plan.

2. The system of claim 1, wherein the temporal information is received from the plurality of agents via message passing.

3. The system of claim 1, wherein the graphical representation includes nodes and edges, wherein each node of the nodes represents an agent of the plurality of agents, and wherein each edge of the edges represents a direct influence between the plurality of agents.

4. The system of claim 1, wherein the graphical representation describes shared dependence of the agents of the plurality of agents.

5. The system of claim 1, wherein the agents of the plurality of agents are vehicles and the ego agent is a host vehicle, and wherein the plurality of agents are traveling on a roadway that is a T-intersection.

6. The system of claim 5, wherein the motion plan includes a turn maneuver through the T-intersection based on the latent states of the agents of the plurality of agents.

7. A method for path planning with latent state inference and graphical relationships, the method comprising:

receiving sensor data associated with a plurality of agents, wherein the plurality of agents includes an ego agent;

mapping the sensor data to a latent state distribution to identify latent states of the plurality of agents;

predicting future trajectories of the plurality of agents at a given time based on sensor data and the latent states of the plurality of agents;

generating a graphical representation based on the sensor data and a graphical representation neural network, wherein temporal information is applied to the sensor data so the graphical representation includes spatial-temporal relationships between the ego agent and the agents of the plurality of agents;

generating a motion plan for the ego agent based on the predicted future trajectories and the graphical representation; and causing the ego agent to execute the motion plan.

8. The method of claim 7, wherein the temporal information is received from the plurality of agents via message passing.

9. The method of claim 7, wherein the graphical representation includes nodes and edges, wherein each node of the nodes represents an agent of the plurality of agents, and wherein each edge of the edges represents a direct influence between the plurality of agents.

10. The method of claim 7, wherein the graphical representation describes shared dependence of the agents of the plurality of agents.

11. The method of claim 7, wherein the agents of the plurality of agents are vehicles and the ego agent is a host vehicle, and wherein the plurality of agents are traveling on a roadway that is a T-intersection.

12. The method of claim 11, wherein the motion plan includes a turn maneuver through the T-intersection based on the latent states of the agents of the plurality of agents.

13. A system for path planning with latent state inference and graphical relationships, the system comprising:

an inference module configured to:

receive sensor data associated with a plurality of agents, wherein the plurality of agents includes an ego agent; and map the sensor data to a latent state distribution to identify latent states of the plurality of agents, wherein the latent states identify agents of the plurality of agents as cooperative or aggressive with respect to the ego agent;

a policy module configured to predict future trajectories of the plurality of agents at a given time based on the sensor data and the latent states of the plurality of agents;

a graphical representation module configured generate a graphical representation based on the sensor data and a graphical representation neural network;

a planning module configured to generate a motion plan for the ego agent based on the predicted future trajectories and the graphical representation; and an execution module configured to cause the ego agent to execute the motion plan, and receive sensor data to confirm the plurality of agents yield to the ego agent as predicted by the policy module, wherein the inference module maps actions of the plurality of agents to the latent distribution.

14. The system of claim 13, wherein the graphical representation module is further configured to:

receive temporal information; and apply the temporal information to include spatial-temporal relationships in the graphical representation.

15. The system of claim 14, wherein the temporal information is received from the plurality of agents via message passing.

16. The system of claim 14, wherein the graphical representation includes nodes and edges, wherein each node of the nodes represents an agent of the plurality of agents, and wherein each edge of the edges represents a direct influence between the plurality of agents.

17. The system of claim 14, wherein the graphical representation describes shared dependence of the agents of the plurality of agents.

18. The system of claim 14, wherein the agents of the plurality of agents are vehicles and the ego agent is a host vehicle, and wherein the plurality of agents are traveling on a roadway that is a T-intersection.

19. The system of claim 18, wherein the motion plan includes a turn maneuver through the T-intersection based on the latent states of the agents of the plurality of agents.

* * * * *